United States Patent [19]

Shope

[11] 4,333,494
[45] Jun. 8, 1982

[54] VALVE BOX

[75] Inventor: Thomas Shope, Kearny, N.J.

[73] Assignee: CP Test Services - Valvco, Inc., Kearny, N.J.

[21] Appl. No.: 116,883

[22] Filed: Jan. 30, 1980

[51] Int. Cl.³ .............................................. F16L 5/00
[52] U.S. Cl. .................................................... 137/364
[58] Field of Search ............... 137/363, 364, 365, 366, 137/367, 368, 369, 370, 382

[56] References Cited

U.S. PATENT DOCUMENTS

| | | | |
|---|---|---|---|
| 961,178 | 6/1910 | Tyler | 137/369 |
| 1,325,393 | 12/1919 | Calhoun | 137/367 |
| 2,059,085 | 10/1936 | Buck | 137/364 |
| 2,099,479 | 11/1937 | Heinkel et al. | 137/367 |
| 2,691,384 | 10/1954 | Mueller et al. | 137/366 |
| 3,548,864 | 12/1970 | Handley et al. | 137/364 |
| 3,601,143 | 8/1971 | Glennon | 137/364 |

Primary Examiner—A. Michael Chambers
Attorney, Agent, or Firm—Carella, Bain, Gilfillan & Rhodes

[57] ABSTRACT

A valve box consisting of a generally vertically elongated tube, pipe or cylinder having formed on the body thereof a hollow housing adapted to receive and cover an underground valve, more particularly a valve fabricated of a synthetic material having a unitary valve body and inlet and outlet conduits in which the housing is provided with at least two inwardly projecting ribs adapted to engage the valve body thereby positively limiting its upward movement in the housing to preclude the inlet and outlet conduit from engaging the top of the opposed openings in the side of the housing through which the said conduits extend.

11 Claims, 4 Drawing Figures

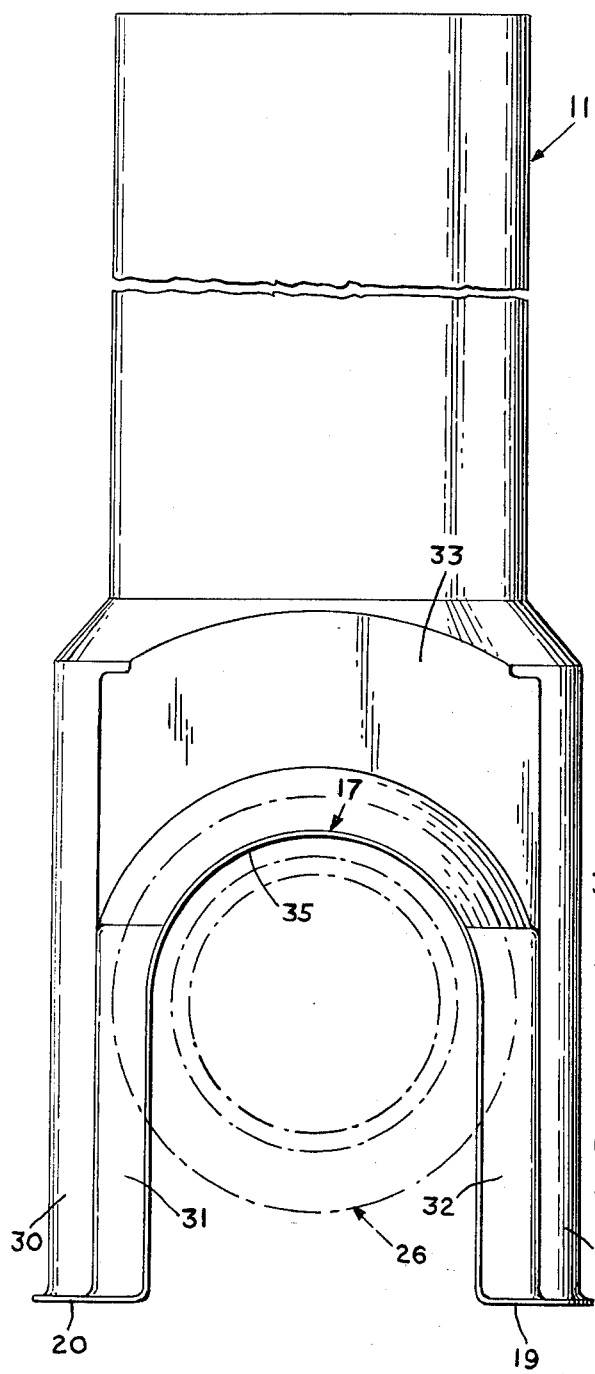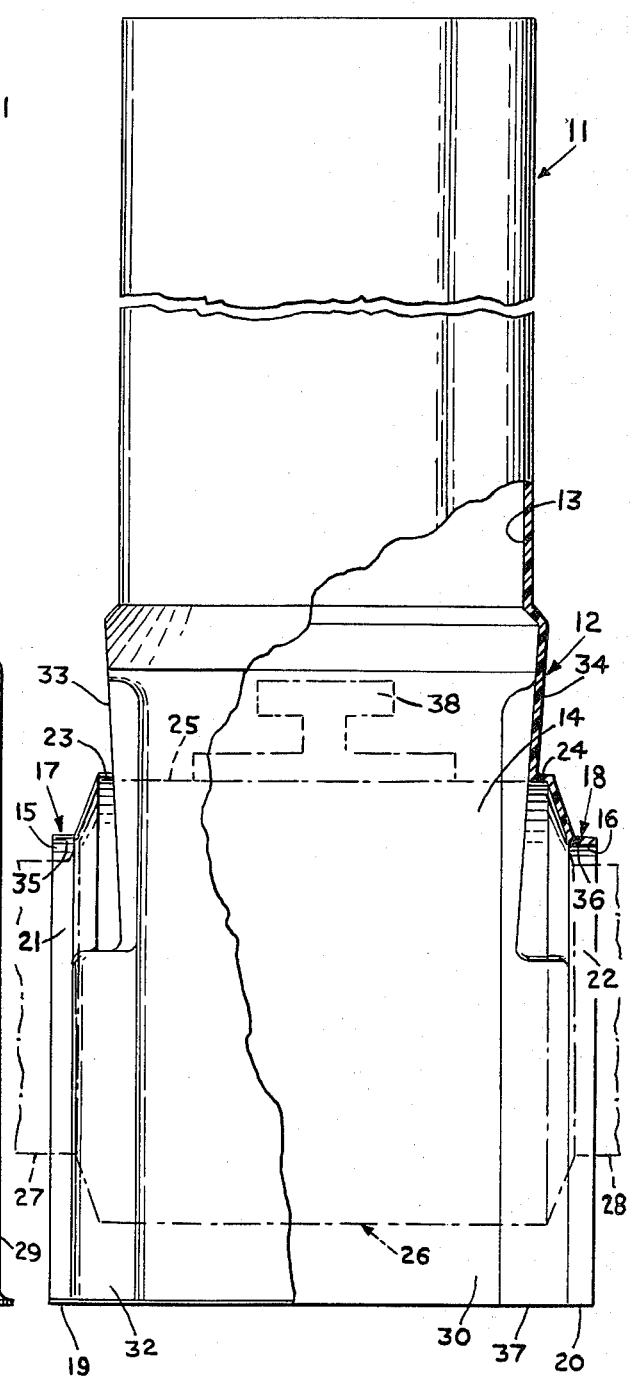
FIG. 1
FIG. 2 ic or plastic pipe instead of the metal pipe heretofor employed. However, until recently the valve body to which the pipe was attached continued to be fabricated of metal. The coupling of a plastic pipe to a metal valve body generated certain problems including torsional stress on the pipe. After a period of time, such torsional stresses spontaneously relieved by a rotation of the pipe which caused a corresponding rotation of the valve body displacing it from its normal vertical orientation. This in turn displaced the valve operating member from the usual vertical plane sometimes sufficiently so as to make extremely difficult, if not preclude, its actuation by the elongated actuating tool extending downwardly from the surface.

VALVE BOX

BACKGROUND OF INVENTION

Valve service boxes, commonly known as curb boxes are well-known in the art. Modern valve boxes are generally fabricated of some suitable plastic, preferably ABS. The entire valve box generally comprises an upper portion having at least one pair of telescoping tubular members, the lowest tubular member having formed thereon at the bottom a hollow valve housing. A typical valve service box of this construction is illustrated in U.S. Pat. No. 3,601,143.

Recent developments in the art of underground pipes and valves have placed demands upon the structural and functional characteristics of valve service boxes not heretofor encountered. Public utilities have adopted the plastic or synthetic pipe instead of the metal pipe heretofor employed. However, until recently the valve body to which the pipe was attached continued to be fabricated of metal. The coupling of a plastic pipe to a metal valve body generated certain problems including torsional stress on the pipe. After a period of time, such torsional stresses spontaneously relieved by a rotation of the pipe which caused a corresponding rotation of the valve body displacing it from its normal vertical orientation. This in turn displaced the valve operating member from the usual vertical plane sometimes sufficiently so as to make extremely difficult, if not preclude, its actuation by the elongated actuating tool extending downwardly from the surface.

Most recently, the public utilities have adopted a valve fabricated of synthetic or plastic materials including a generally unitized valve body with a pair of integral inlet and outlet conduits. The pipe aforesaid is joined to the conduits by means of solvents forming a bond there between which involves the imposition of no torsional stresses on either member. However, the use of synthetic or plastic valves and valve bodies has generated additional problems.

The usual synthetic or plastic valve has a comparatively massive valve body which is structurally strong. Manufacturers recommend that the inlet and outlet conduits formed integrally with the valve body not be stressed by the application of a bearing load to the top or bottom thereof.

In the past, valve service housings or curb boxes have been structurally designed and employed such that the box imposed a vertical load on the extensions of the valve body to which the inlet and outlet pipes are connected. In the past, this was useful because the opening through which the valve body extensions extended were given a non-round or regular geometric configuration so as to restrain the valve body from rotation around the axis extending through the inlet and outlet conduits. This was effective to avoid the problem of plastic pipes relieving torsional stress in such a manner as to rotate the valve about said axis and thereby displace its actuating member from the vertical.

Accordingly, it is among the objects and advantages of the present invention to provide a valve service box with a hollow housing provided with internal bearing means adapted to engage the valve body to positively limit its upward movement in the housing such that the inlet and outlet conduits are vertically spaced away from the top of the openings through which they extend.

The most convenient and least costly method of fabricating the housing at the bottom of a valve service box is by blow-molding techniques employing a synthetic material such as ABS. Such blow molded synthetic housings are very substantially less rigid than a cast iron housing. Once a housing is in place over the valve, rotation of the housing about a vertical axis should be positively restrained. Otherwise, the inlet and outlet conduits will be bearing loaded from the side placing a stress upon the joint as well as the valve itself.

If the housing is formed in the shape of a generally radially enlarged cylindrical bell, there is little or no restraint against rotation about a vertical axis. Moreover, the side walls of such a housing are relatively weak particularly with the relatively large openings necessary to accommodate plastic valves.

Accordingly, it is among the further objects and advantages of the present invention to provide generally vertically extending flat wall portions on the housing which not only increase the rigidity of the housing wall and its vertical bearing load capabilities but also positively restrain the housing against rotation about a vertical axis.

SUMMARY OF INVENTION

A valve box comprising a generally vertically elongated, hollow member open at its bottom, a hollow valve housing formed on the bottom of said member, the interior of said member and housing communicating; the housing being open at its bottom end and adapted to receive a valve body having diametrically opposed inlet and outlet conduits extending generally horizontally therefrom; at least two diametrically opposed inlet and outlet conduit-receiving openings in the side of the housing, each said opening closed at the top and communicating with the open bottom of the housing; internal bearing means on the housing adapted to engage the valve body to positively limit its upward movement in the housing; the valve body engaging the bearing means when the said inlet and outlet conduits are vertically spaced away from the top of the respective conduit openings.

PREFERRED EMBODIMENT OF INVENTION

The objects and advantages aforesaid as well as other objects and advantages may be achieved by the valve service boxes claimed herein preferred embodiments of which are illustrated in the drawings in which:

FIG. 1 is a side elevational view of one form of valve box housing showing a unitized, plastic valve body with integral inlet and outlet conduits extending therefrom show schematically in broken lines;

FIG. 2 is an end elevational view of the valve box illustrated in FIG. 1;

Figure 3:
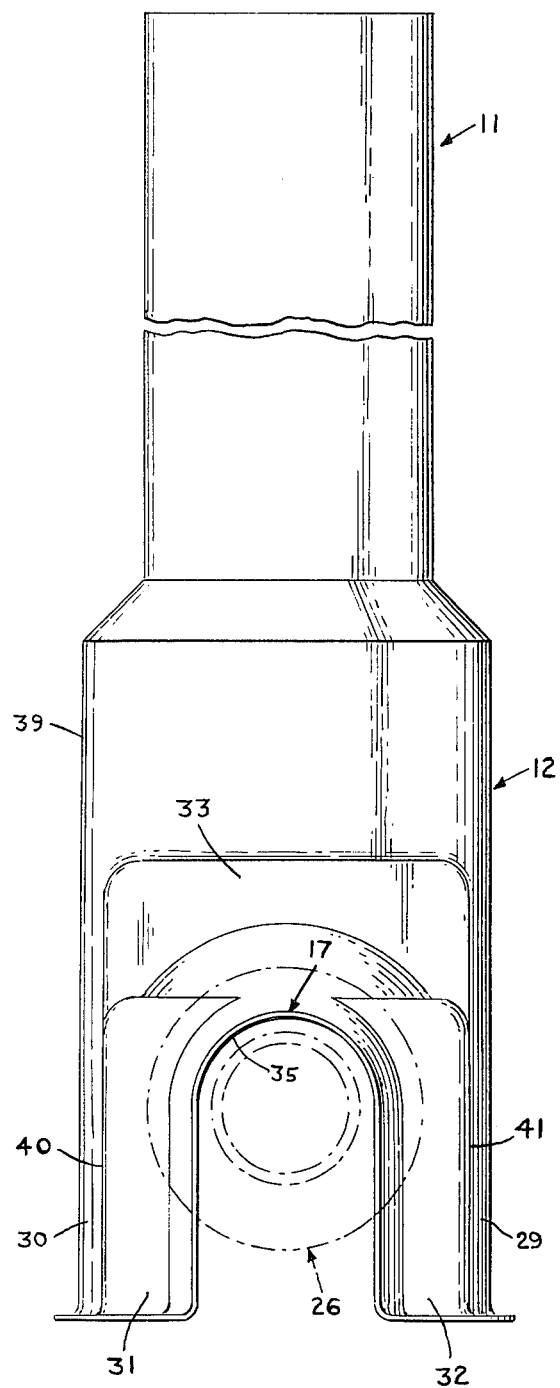
FIG. 3 is a side elevational view of another form of valve box showing the aforesaid valve in broken lines.

Referring now to the drawings in detail, the valve box illustrated in FIGS. 1 and 2 consists of a generally vertically elongated tubular or hollow cylindrical member 11 having formed thereon at the bottom, a hollow, valve box housing 12. The hollow interior 13 of the member 11 communicates with the hollow interior 14 of the housing 12. Preferably, the member 11 and housing 12 are integral with the housing 12 formed by blow-molding techniques employing ABS as the material of fabrication.

By virtue of the use of blow-molding techniques, the interior surface of the housing 12 conforms to its exterior surface.

The housing 12 is provided with a pair of diametrically opposed side openings 15 and 16 which are closed at the top thereof, respectively 17 and 18, and open at the bottom, respectively 19 and 20.

The tops 17 and 18 of the openings 15 and 16 may be arcuate although an irregular geometric form may optionally be employed. The periphery of each of the openings 15 and 16 is provided with an external upstanding flange, respectively 21 and 22, the purpose for which will be disclosed hereafter.

The housing 12 is provided with a pair of internal, inwardly extending ribs, respectively 23 and 24, generally concentric with and spaced vertically away from the tops 17 and 18 of the openings 15 and 16. The ribs 23 and 24 provide bearing means for engagement to the top 25 of a valve body 26. The valve body 26 as illustrated has a generally cylindrical configuration. Accordingly, the ribs 23 and 24 are arcuate so as to provide conforming bearing surfaces. Nevertheless, were the valve body 26 to have a non-circular cross-sectional configuration, the ribs 23 and 24 may be fabricated to conform to the cross-sectional configuration of the valve body 26. Even if the valve body 26 were to have a non-circular cross-sectional configuration, an arcuate rib such as illustrated at 23 and 24 would also provide a bearing surface for engagement to the valve body but the engagement would not be continuous along the rib which is a preferred embodiment.

The valve body 26 as formed integrally with lateral inlet and outlet conduits, respectively 27 and 28, which extend through openings 15 and 16 respectively. The ribs 23 and 24 are positioned with respect to the openings 15 and 16 and to the configuration and dimension of the valve body 26 so that the conduits 27 and 28 are vertically spaced away from the tops 17 and 18 of the openings 15 and 16 respectively. Accordingly, the ribs 23 and 24 provide a positive limit for the upward movement of the valve body 26 into the interior 14 of the housing 12. Thus, any vertically imposed bearing loads are first imposed on the strong, massive valve body 26 and not on conduits 27 and 28.

Preferably, the housing 12 is dimensioned to receive the entire valve body 26 before the ribs 23 and 24 are engaged. This in turn transmits most vertical loading to the bottom of the side walls 29 and 30 of the housing 12.

The housing 12 is relatively thin walled and the openings 15 and 16 comparatively large. Accordingly, it is desirable to provide bearing surfaces on the sides of the housing 12 to increase rigidity so that vertical loads are substantially entirely in compression and to prevent rotation of the housing 12 about its vertical axis. The housing 12 is provided with a pair of external generally vertically extending flat portions, 31 and 32, adjacent to each of the openings 15 and 16. Additionally, the housing 12 is provided with a vertically extending flat portion 33 and 34 above the tops 17 and 18 respectively of the openings 15 and 16.

In accordance with good practice and also as a preferred embodiment of this invention, is the provision of an outwardly extending flange 35 and 36 surrounding openings 15 and 16 respectively. Flanges 35 and 36 provide an added measure of protection for the plastic conduits 27 and 28 by removing the possibility that a sharp edge extending vertically thereinto might cut into the said conduits which, fabricated of plastic, are less resistant to cutting than metal.

The flats 31, 32, 33 and 34 also provide a bearing surface for backfill around the housing 12 which helps prevent distortion of the housing under vertical loads which might conceivably permit the valve body 26 to move up past ribs 23 and 24 so as to impose vertical loads on conduits 27 and 28.

Again in conformity with general practice, a radially extending flange 35 is provided on the bottom edge of the housing 12 so as to provide a bearing surface greater than the thickness of the edge. In operation, the valve actuating member 38 desirably extends vertically upwardly generally centrally located with respect to the hollow interior 13 of conduit 11. The actuating tool which is provided on the end of an elongated shaft, extends downwardly through the member 11 into the interior 14 of housing 12 to engage the actuating member 38. The actuating tool which is generally in the shape of a yoke must have sufficient clearance from the interior wall of the housing 12 on opposite sides of the actuating member 38 so as to permit rotation. In the embodiment of the invention illustrated in FIGS. 1 and 2, the size of the valve itself dictates the minimum dimensions of the interior of the housing 12 thereby providing sufficient clearance between the actuating member 38 in the interior of the housing. However, in some instances, the diameter of the valve body 26 is sufficiently great with respect to its width along the horizontal axis that a radially enlarged portion on the valve housing 12 must be provided above the flat portions of the wall lying over the openings for the inlet and outlet conduits. Such a valve box is illustrated in FIGS. 3 and 4.

Figure 4:
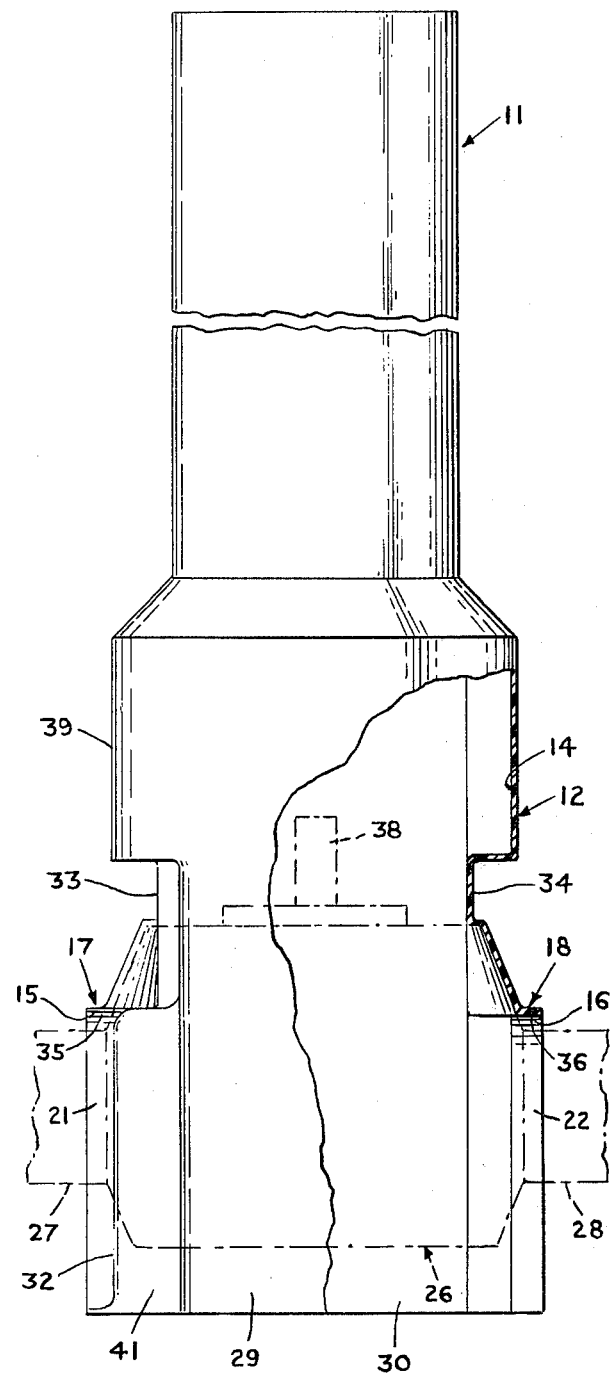
FIG. 4 is an end elevational view of the valve box housing illustrated in FIG. 3.

Referring now to FIGS. 3 and 4, all structural elements corresponding to the same elements found in the embodiment illustrated in FIGS. 1 and 2 are given the same reference numeral. The difference between the embodiment illustrated in FIGS. 1 and 2 and that illustrated in FIGS. 3 and 4 lies in the provision of an internal radially enlarged portion 39 lying above flat portions 33 and 34. The actuating member 38 of the valve extends upwardly into the radially enlarged portion 39.

In order to provide additional rigidity, in both embodiments of the invention illustrated and described above, an additional generally vertically extending flat portion 40, 41 may be provided on opposite sides of the openings 15 and 16 oriented generally at right angles to flat portions 31 and 32.

What is claimed is:

1. A valve box comprising
   (a) a generally vertically elongated, hollow member open at its bottom;
   (b) a hollow valve housing formed on the bottom of said member, the interiors of said member and housing communicating; the housing being open at its bottom end and adapted to receive a valve body having diametrically opposed inlet and outlet conduits extending generally horizontally therefrom;
   (c) at least two diametrically opposed inlet and outlet conduit receiving openings in the side of the housing, each said opening being closed at the top and communicating with the open bottom of the housing;
   (d) internal bearing means on the housing adapted to engage the valve body to positively limit its upward movement in the housing; and (e) the valve body engaging the bearing means when the said inlet and outlet conduits are vertically spaced away from the top of the respective conduit openings.

2. A valve box in accordance with claim 1 in which
   (a) the said internal bearing means is an internally extending rib on the internal surface of the housing.

3. A valve box in accordance with claim 1 in which
   (a) the said bearing means is an internally extending rib in the housing generally parallel to and vertically spaced away from one of the said diametrically opposed openings.

4. A valve box in accordance with claim 1 in which
   (a) the said bearing means are a pair of generally opposed, inwardly extending ribs on the housing, each of said ribs being generally parallel to and vertically spaced away from the said diametrically opposed openings.

5. (a) A valve box in accordance with any one of claims 1, 2, 3 or 4 and (b) an external, generally vertically extending flat portion on the valve housing.

6. A valve box in accordance with any one of claims 1, 2, 3 or 4 and
   (a) an external, generally vertically extending flat portion on the housing above the top of at least one of the said diametrically opposed openings.

7. A valve box in accordance with any one of claims 1, 2, 3 4 and
   (a) an external, generally vertically extending flat portion on the housing at at least one side of at least one of the said diametrically opposed openings.

8. A valve box in accordance with any one of claims 1, 2, 3 or 4 and
   (a) an external, generally vertically extending flat portion on the housing above the top of at least one of the said diametrically opposed openings, and
   (b) an external, generally vertically extending flat portion on the housing at at least one side of at least one of the said diametrically opposed openings.

9. A valve box in accordance with any one of claims 1, 2, 3 or 4 and
   (a) external, generally vertically extending flat portions on the housing both adjacent to and above each of the said diametrically opposed openings.

10. A valve box in accordance with any one of claims 1, 2, 3 or 4 and
    (a) an external, generally flat portion on the housing above each of the said diametrically opposed openings, and
    (b) an internally radially enlarged portion in the housing above the said external flat portions.

11. A valve box in accordance with any one of claims 1, 2, 3 or 4 and
    (a) external, generally vertically extending flat portions on the housing both adjacent to and above each of the said diametrically opposed openings, and
    (b) an internal, radially enlarged portion in the housing with respect to and above the said external flat portions above the diametrically opposed openings.

* * * * *